United States Patent
Lee et al.

(10) Patent No.: US 9,505,320 B2
(45) Date of Patent: Nov. 29, 2016

(54) APPARATUS FOR ADJUSTING SEAT HEIGHT

(71) Applicant: Hyundai Dymos Incorporated, Chungcheongnam-do (KR)

(72) Inventors: Young Sun Lee, Gyeonggi-do (KR); Eom Seok Yoo, Gyeonggi-do (KR)

(73) Assignee: Hyundai Dymos Incorporated, Seosan-si, Chungcheongnam-do (KR)

( * ) Notice: Subject to any disclaimer, the term of this patent is extended or adjusted under 35 U.S.C. 154(b) by 0 days.

(21) Appl. No.: 14/745,786

(22) Filed: Jun. 22, 2015

(65) Prior Publication Data

US 2015/0367755 A1 Dec. 24, 2015

(30) Foreign Application Priority Data

Jun. 20, 2014 (KR) .................... 10-2014-0075682

(51) Int. Cl.
*B60N 2/16* (2006.01)

(52) U.S. Cl.
CPC ............. *B60N 2/1685* (2013.01); *B60N 2/168* (2013.01)

(58) Field of Classification Search
CPC ............................... B60N 2/168; B60N 2/1685
USPC ..................................... 297/362, 363, 344.12
See application file for complete search history.

(56) References Cited

U.S. PATENT DOCUMENTS

| | | | | |
|---|---|---|---|---|
| 2,171,458 A * | 8/1939 | Swartz | ...................... | F16B 1/04 192/223.2 |
| 2,559,960 A * | 7/1951 | Houplain | .................. | F16B 1/04 192/223.3 |
| 3,243,023 A * | 3/1966 | Boyden | ..................... | F16B 1/04 192/223.2 |
| 3,319,747 A * | 5/1967 | Lauper | ...................... | F16B 1/04 192/223.2 |
| 3,958,828 A * | 5/1976 | Ishida | .................. | B60N 2/2218 297/361.1 |
| 4,371,207 A * | 2/1983 | Wilking | ................. | B60N 2/162 297/362 X |
| 5,096,261 A * | 3/1992 | Baloche | ............... | B60N 2/2252 297/362 |
| 5,277,672 A * | 1/1994 | Droulon | ............... | B60N 2/2252 297/362 |
| 5,896,973 A * | 4/1999 | Hochmuth | ............... | B60N 2/02 192/223.2 |
| 6,212,965 B1 * | 4/2001 | Hochmuth | ........... | B60N 2/2257 297/362 X |
| 6,273,233 B1 * | 8/2001 | Denis | .................. | B60N 2/2257 192/223.2 |
| 6,288,464 B1 * | 9/2001 | Torii | .................... | H02K 7/1166 192/223.2 |
| 6,481,557 B2 * | 11/2002 | Denis | ..................... | B60N 2/167 192/15 |
| 6,508,347 B1 * | 1/2003 | Hochmuth | ........... | B60N 2/2227 297/362 X |

(Continued)

FOREIGN PATENT DOCUMENTS

JP 07069108 A * 3/1995
KR 1020050007915 1/2005

(Continued)

*Primary Examiner* — Rodney B White
(74) *Attorney, Agent, or Firm* — Brinks Gilson & Lione

(57) ABSTRACT

Provided is an apparatus for adjusting a seat height, including: a fixed member fixedly installed at a seat cushion, the fixed member including a plurality of first stoppers at predetermined radial positions from a center of an axial direction; an input member rotatably installed on an axis concentric with the fixed member, the input member having hook parts formed to protrude at radial positions facing the first stoppers; an output member rotatably and concentrically installed with respect to the input member, the output member having a friction flange part formed to protrude along a circumferential direction at a predetermined radial position facing an inner circumferential surface of the input member; and a frictional rotation means rotatably installed between the inner circumferential surface of the input member and an outer circumferential surface of the friction flange part to be flexibly rotated along the circumferential direction.

5 Claims, 4 Drawing Sheets

(56) References Cited

U.S. PATENT DOCUMENTS

| | | | | |
|---|---|---|---|---|
| 6,568,759 B1* | 5/2003 | Hochmuth | ............ | B60N 2/2227 297/362 |
| 6,641,215 B2* | 11/2003 | Rohee | ................... | B60N 2/167 192/223.2 |
| 6,951,270 B2* | 10/2005 | Liu | ........................ | A47C 7/462 192/19 |
| 7,048,107 B1* | 5/2006 | Geis | ..................... | F16D 41/105 192/223.2 |
| 7,182,196 B2* | 2/2007 | Weber | ..................... | B60N 2/16 192/15 |
| 8,181,763 B2* | 5/2012 | Gresley | ................. | H02K 7/108 192/223.2 |
| 8,672,408 B2* | 3/2014 | Legras | ................. | B60N 2/2255 297/362 X |
| 8,720,661 B2* | 5/2014 | Karthaus | .............. | B60N 2/2257 297/362 X |
| 9,205,765 B2* | 12/2015 | Kim | ..................... | B60N 2/2254 |
| 2003/0173182 A1* | 9/2003 | Kim | ....................... | B60N 2/167 192/223.2 |
| 2006/0011439 A1* | 1/2006 | Henriksson | .............. | A61G 5/02 192/45.01 |
| 2007/0085399 A1* | 4/2007 | Nathan | ................ | B60N 2/2257 297/362 |

FOREIGN PATENT DOCUMENTS

| | | |
|---|---|---|
| KR | 1020120050394 | 5/2012 |
| KR | 1020140016064 | 2/2014 |

* cited by examiner

APPARATUS FOR ADJUSTING SEAT HEIGHT

CROSS-REFERENCE TO RELATED APPLICATIONS

This application claims the benefit of Korean Patent Application No. 10-2014-0075682, filed on Jun. 20, 2014. The disclosures of the above application are incorporated herein by reference

FIELD

The present disclosure generally relates to an apparatus for adjusting a seat height. More particularly, the present disclosure relates to an apparatus for adjusting a seat height.

BACKGROUND

The statements in this section merely provide background information related to the present disclosure and may not constitute prior art.

Generally, as illustrated in FIG. 1, a seat 1 of a vehicle includes a seat cushion 1a and a seat back 1b wherein the seat cushion 1a is configured so that height can be adjusted by a pumping device, and the seat back 1b is configured so that an angle can be adjusted in a forward or backward direction by a reclining device.

In the seat cushion 1a, the pumping device is linked with a link means of the seat cushion and is installed so as to enable the transmission of power. As illustrated in FIG. 1, an operation of the pumping device is performed by an up-down operation of a handle lever 3 protruding to an outer side of the seat cushion 1a.

With regard to such a pumping device, various kinds of pumping devices have been developed and used.

Meanwhile, a conventional "seat cushion pumping device for a vehicle" has been introduced in Korean Patent Application Publication No. 10-2005-0007915.

That is, the pumping device includes: a clutch means adopted to transmit the up-down operation of the handle lever to the link means of the seat cushion; and a brake means adopted to restrict the link means of the seat cushion for preventing it from being moved after the completion of an operation.

However, in the conventional pumping device, the operation of the handle lever is transmitted to the link means of the seat cushion, a structure in which the link means is restricted so as to be prevented from being moved is complicated, and the number of components is increased. Thus, it is problematic in that a production cost of the pumping device is increased, and a manufacturing process is complicated.

The foregoing is intended only to aid in the understanding of the background of the present disclosure, and is not intended to mean that the present disclosure falls within the purview of the related art that is already known to those skilled in the art.

SUMMARY

Accordingly, the present disclosure provides an apparatus for adjusting a seat height, which is configured such that an operational force transmitting action and a reverse input blocking action between a handle lever and a link means are compactly performed thanks to a press-fit structure of friction balls so that the cost of production for the product can be lowered, and productivity can be increased.

According to one aspect of the present disclosure, there is provided an apparatus for adjusting a seat height, including: a fixed member fixedly installed at a seat cushion, the fixed member including a plurality of first stoppers at predetermined radial positions from a center of an axial direction; an input member rotatably installed on an axis concentric with the fixed member, the input member having hook parts formed to protrude at radial positions facing the first stoppers; an output member rotatably and concentrically installed with respect to the input member, the output member having a friction flange part formed to protrude along a circumferential direction at a predetermined radial position facing an inner circumferential surface of the input member; a frictional rotation means rotatably installed between the inner circumferential surface of the input member and an outer circumferential surface of the friction flange part to be flexibly rotated along the circumferential direction, wherein the frictional rotation means is engaged with the hook parts upon rotating of the input member and is rotated in a state of being press-fitted in the friction flange part so that the output member can be rotated with the input member in a state of being prevented from relative rotation with the input member, and the frictional rotation means is released from the hook parts upon return rotation of the input member and is then rotated in a state of being released from the friction flange part so that only the input member can be relatively rotated with respect to the output member.

The frictional rotation means may include: friction balls formed in a ball-like shape, and arranged at opposite ends of each of the hook parts; and return springs each arranged between the friction balls disposed in a gap between the hook parts and adopted to provide an elastic restoring force with respect to a rotation displacement of the friction balls rotated along the circumferential direction.

The first stoppers may be disposed radially from a center of an axial direction of the fixed member, the first stoppers being disposed in a space between an inner circumferential surface of the input member and the outer circumferential surface of the friction flange part.

Each of the hook parts may be configured such that a central portion is formed to protrude toward the center of an axial direction of the inner circumferential surface of the input member, and opposite ends are disposed to be spaced apart from each other by a predetermined distance along the inner circumferential surface of the input member from the central portion, thereby enabling each of press-fitted inclination surfaces to be formed between the central portion and the opposite ends.

Rotating parts may be formed from the center of the axial direction of the input member to a radial direction, and second stoppers are formed at predetermined radial positions from the center of an axial direction of the fixed member, each of the second stoppers being disposed at a rotating path of the rotating parts so as to limit a rotation angle of the rotating parts.

The input member may be linked with a handle lever of an outer portion of the seat cushion so that a rotating force can be provided from the outer portion, and the output member may be linked with a link means disposed in the seat cushion so that the rotating force provided by the input member can be transmitted to the link means.

The present disclosure enables the input member and the output member to be mechanically clutch-controlled by a press fitting force resulting from rotational movement of the friction balls, an operational force transmitting action between the handle lever and the link means, and thus a reverse input blocking action transmitted from the link means to the handle lever are compactly performed so that the cost of production for the product can be lowered, and productivity can be increased.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 3:
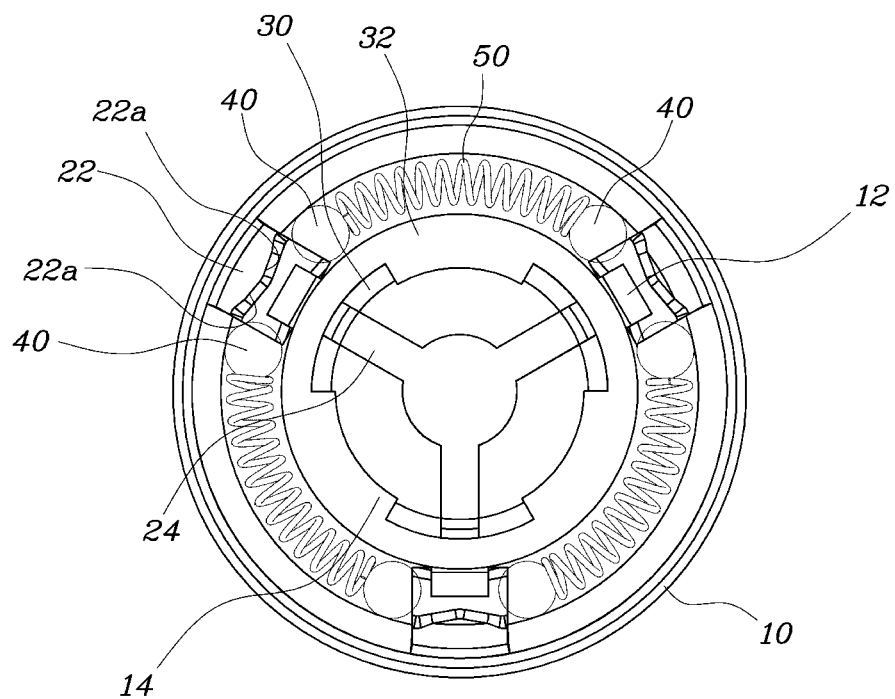
Figure 4:
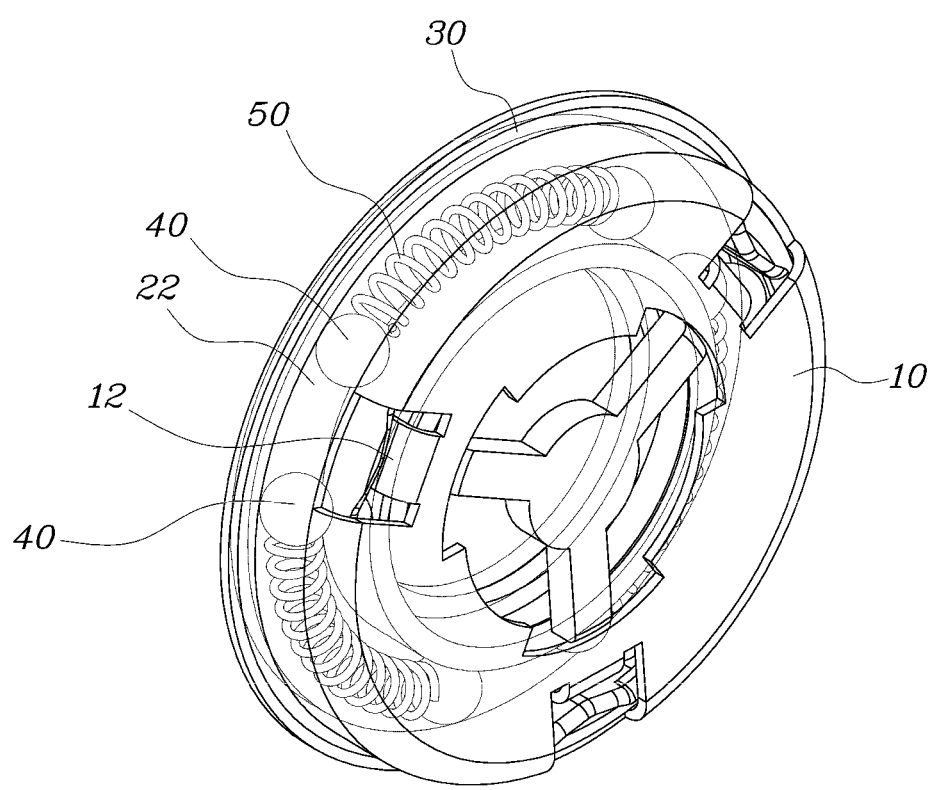

FIG. 3 is a view illustrated for explaining a structure in which the components of the apparatus for adjusting a seat height are coupled to each other, and an operational principle of the structure; and FIG. 4 is a perspective view showing the apparatus for adjusting a seat height resulting from cutting a part of a fixed member in the structure in which the components of the apparatus for adjusting a seat height are coupled to each other.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Herein below, an one form of the present disclosure will be described in detail with reference to the accompanying drawings.

Figure 1:
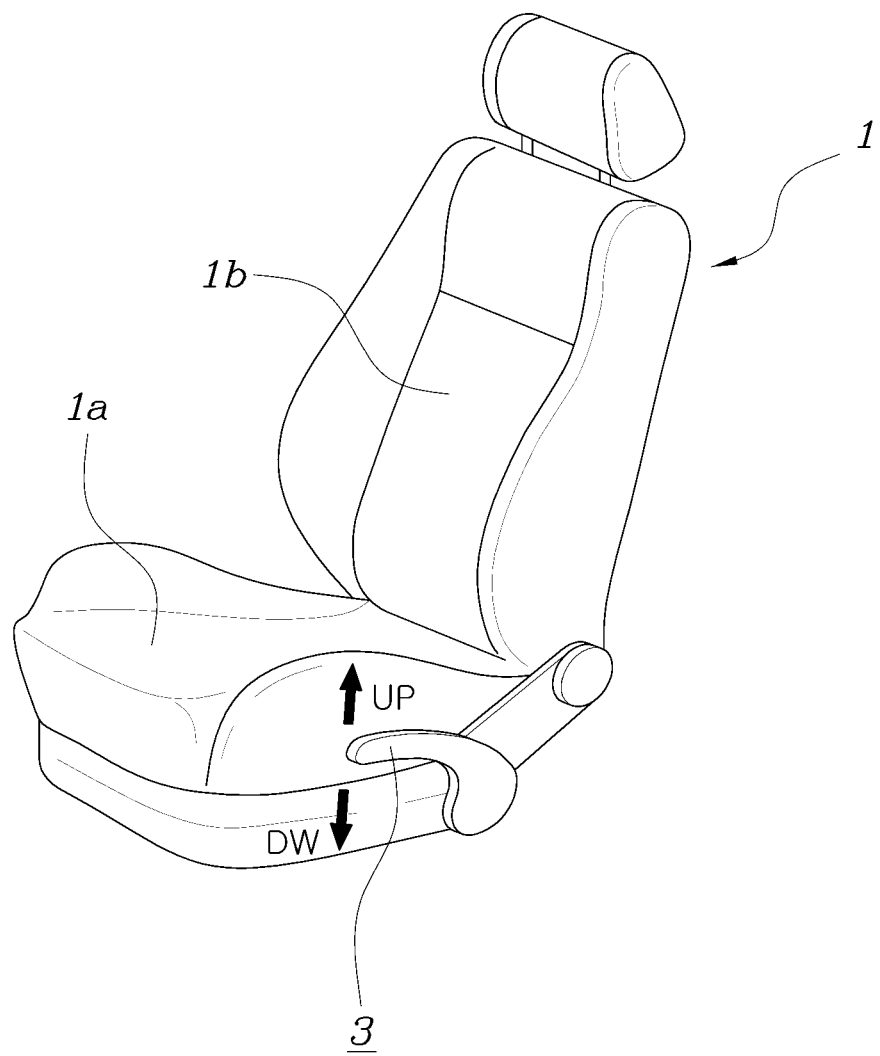
FIG. 1 is a view illustrating an external appearance of a seat to which a pumping device according to the prior art is applied.
Figure 2:
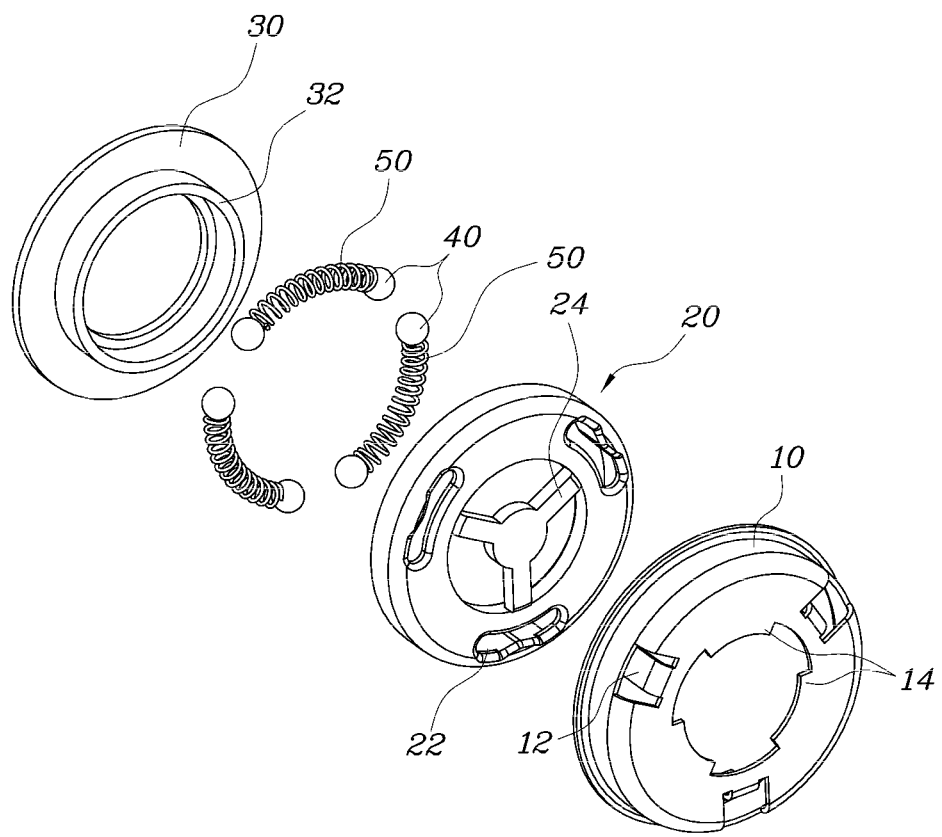
FIG. 2 is a perspective view showing the disassembly of components of an apparatus for adjusting a seat height according to the present disclosure.

FIG. 2 is a perspective view showing the disassembly of components of an apparatus for adjusting a seat height according to the present disclosure; FIG. 3 is a view illustrated for explaining a structure in which the components of the apparatus for adjusting a seat height are coupled to each other, and an operational principle of the structure; and FIG. 4 is a perspective view showing the apparatus for adjusting a seat height resulting from cutting a part of a fixed member in the structure in which the components of the apparatus for adjusting a seat height are coupled to each other.

The apparatus for adjusting a seat height includes: a fixed member 10, an input member 20, and an output member 30, and a frictional rotation means.

Specifically reviewing the present disclosure with reference to FIGS. 2 to 4, the apparatus for adjusting a seat height includes: the fixed member 10 fixedly installed in a seat cushion, the fixed member including a plurality of first stoppers 12 formed at respective predetermined radial positions on the basis of an axial direction; the input member 20 rotatably installed on an axis concentric with the fixed member, the input member having hook parts 22 formed to protrude at respective radial positions facing the first stoppers 12; the output member 30 relatively, rotatably, and concentrically installed with respect to the input member 20, the output member having a friction flange part 32 formed to protrude along a circumferential direction at a predetermined radial position facing an inner circumferential surface of the input member 20; and the frictional rotation means rotatably installed between the inner circumferential surface of the input member 20 and an outer circumferential surface of the friction flange part 32 to be flexibly rotated along the circumferential direction, wherein the frictional rotation means is engaged with the hook parts 22 upon rotating of the input member 20 and is rotated in a state of being press-fitted in the friction flange part 32 so that the output member 30 can be rotated with the input member 20 in a state of being prevented from relative rotation with the input member 20, and the frictional rotation means is released from the hook parts 22 upon return rotation of the input member 20 and is rotated in a state of being released from the friction flange part 32 so that only the input member 20 can be relatively rotated with respect to the output member 30.

According to additional explanation, the fixed member 10 may be fixedly installed at a side of the seat cushion and may be configured such that a center of the fixed member is formed in a hollow cylindrical shape. Furthermore, the first stoppers 12 may be formed to protrude toward an inner side of the fixed member 10. The first stoppers 12 may function to selectively limit the movement of friction balls 40.

Moreover, the input member 20 may be formed in a cylindrical shape so as to be inserted into the inner side of the fixed member 10, and a handle lever provided at an outer portion of the seat cushion may be coupled to the input member 20 so that a rotating force can be provided by an operation of the handle lever, thereby enabling the input member 20 to be rotated.

Furthermore, the output member 30 is insertedly installed at an inner side of the input member 20 and is configured such that the friction flange part 32 is formed to protrude at a predetermined radial position of the output member 30 toward a side direction, and a space is formed between the outer circumferential surface of the friction flange part 32 and the inner circumferential surface of the input member 20 so that a rotation path in which the friction balls 40 are rotated along the circumferential direction of the output member 30 may be provided.

Also, the output member 30 is linked with a link means disposed in the seat cushion so that a rotating force provided by the input member 20 can be transmitted to the link means.

Here, configurations of the handle lever and the line means correspond to technical configurations that are known in the relevant technical field, and the detailed description of the configurations of the handle lever and the link means are thus omitted for purposes of clarity.

Meanwhile, as one example of the frictional rotation means, the frictional rotation means may include the friction balls 40 and return springs 50.

Specifically, the frictional rotation means may include: the friction balls 40 that are formed in a ball-like shape and are disposed at opposite ends of each of the hook parts 22; and each of the return springs 50 that is disposed between the adjacent friction balls 40 in a gap between the hook parts 22 and are configured to provide an elastic restoring force with respect to a rotation displacement of the friction balls rotated along the circumferential direction.

That is, two friction balls 40 are provided between two adjacent hook parts 22, and each of the return springs 50 is provided between the adjacent friction balls 40 along the circumferential direction for rotation of the friction balls 40. Thus, thanks to the elastic restoring force, the friction balls 40 may provide an elastic force to the hook parts 22.

According to such a configuration, referring to FIG. 3, when the input member 20 is rotated in a clockwise direction by a rotational operation of the handle lever, each of the hook parts is also rotated in a state where one of the adjacent friction balls 40 is put on one surface of the hook part 22 formed in a rotating direction of the input member 20. Thus, as one friction ball is press-fit by the hook part 22, a press-fitting force of the one friction ball 40 is completely transmitted to the friction flange part 32 formed in the output member 30. Due to this, the input member 20 and the output member 30 are rotated together so that an operational force for adjusting a seat height can be provided to a link means.

However, in the case of the other friction ball 40 of the adjacent friction balls provided on the other surface of each hook part 22, as each of the hook parts 22 is rotated in a clockwise direction, the other friction ball provided on the other surface of each hook part is also rotated in the clockwise direction by elasticity of each of the return spring 50. Accordingly, the other friction ball 40, which is not put on one surface of each hook part 22, is put on each of the first stoppers 12, so that rotation movement is restricted, and an elastic restoring force applied to the respective friction balls 40 by compression of each of the return springs 50 is increased.

Then, when the input member 20 is return-rotated in a counterclockwise direction by releasing the operation of the handle lever, each of the hook parts 22 is also rotated in the counterclockwise direction, one of the adjacent friction balls 40 is not contact with one surface of each hook part, and due to this, an press fitting force of the friction balls 40 applied to the friction flange part 32 is released so that only the input member 20 can be return-rotated in a state where rotation of the output member 30 is restricted.

At this time, the friction balls 40 may be returned and moved, by an elastic restoring force of the return springs 50, at a position before the rotational operation of the input member 20.

Here, it has been exemplified that a rotation direction of the input member is the clockwise direction. However, even though the input member is rotated in a counterclockwise direction, an operational force may be provided to the link means based on the same operational relation as that of the case in which the input member is rotated in the clockwise direction.

As such, in the present disclosure, since the input member 20 and the output member 30 are mechanically clutch-controlled by a press fitting force resulting from rotation movement of the friction balls 40, an operational force transmitting action and a reverse input blocking action between the handle lever and the link means are compactly performed so that the cost of production for the product can be lowered, and productivity can be increased.

In the present disclosure, as illustrated in FIGS. 2 to 4, each of the first stoppers 12 may be disposed radially from the center of an axial direction of the fixed member 10 and may be also disposed in a space between the inner circumferential surface of the input member 20 and the outer circumferential surface of the friction flange part 32.

That is, when the input member 20 is rotated, the friction balls 40, which are not put on the hook parts 22, are configured to put on the first stoppers 12, so that the return springs 50 can be compressed, and the friction balls 40 can be returned and moved by the elastic restoring force of the return springs 50.

Moreover, each of the hook part 22 is configured such that a central portion is formed to protrude toward the center of an axial direction of the inner circumferential surface of the input member 20, and opposite ends are disposed to be spaced apart from each other by a predetermined distance along the inner circumferential surface of the input member 20 from the central portion so that each of press-fitted inclination surfaces 22a may be formed between the central portion and the opposite ends.

That is, respective surfaces of the friction balls come into roll-contact with the press-fitted inclination surfaces at the time of initial rotation of the input member 20, and at the same time, the friction balls are inserted into a gap between the input member and the output member. Thus, the friction balls 40 can be more accurately and firmly held into the gap between the input member 20 and the output member 30 so that a press fitting force can be transmitted.

Meanwhile, in the present disclosure, rotating parts 24 are formed from the center of the axial direction of the input member 20 to a radial direction, and second stoppers 14 are formed at predetermined radial positions from the center of an axial direction of the fixed member 10, wherein each of the second stoppers 14 is disposed at a rotating path of the rotating parts 24 so as to limit a rotation angle of the rotating parts 24.

That is, the rotating parts 24 may be formed radially from the center of the axial direction of the input member 20 and may be disposed at regular intervals, and each of the second stoppers 14 may be disposed between the rotating parts at regular intervals.

Thus, the rotating parts 24 may be rotated to the extent of a length in the circumferential direction that comes into contact with each side of the second stoppers 14 so that a rotational operation angle of the handle lever intended for rotating the input member 20 can be adjusted.

Meanwhile, although the detailed form of the present disclosure has been described for illustrative purposes, those skilled in the art will appreciate that various modifications, additions and substitutions are possible, without departing from the scope and spirit of the disclosure as disclosed in the accompanying claims.

What is claimed is:

1. An apparatus for adjusting a seat height, comprising:
a fixed member fixedly installed at a seat cushion, the fixed member including a plurality of first stoppers at predetermined radial positions from a center of an axial direction;
an input member rotatably installed on an axis concentric with the fixed member, the input member having hook parts formed to protrude from an inner circumferential surface of the input member at radial positions toward a center of the input member facing the first stoppers;
an output member rotatably and concentrically installed with respect to the input member, the output member having a friction flange part formed to protrude along a circumferential direction at a predetermined radial position, the friction flange part having an outer circumferential surface facing the inner circumferential surface of the input member; and
a frictional rotation means rotatably installed between the inner circumferential surface of the input member and the outer circumferential surface of the friction flange part to be flexibly rotated along the circumferential direction, wherein the frictional rotation means is engaged with the hook parts upon rotating of the input member and is rotated in a state of being press-fitted in the friction flange part so that the output member is rotated with the input member in a state of being prevented from relative rotation with the input member, and the frictional rotation means is released from the hook parts upon return rotation of the input member and is rotated in a state of being released from the friction flange part so that the input member is relatively rotated with respect to the output member;

wherein a center portion of the input member includes rotating parts extending in a radial direction, and wherein a center portion of the fixed member includes second stoppers disposed at predetermined radial positions from the center of the axial direction of the fixed member, each of the second stoppers being disposed at a rotating path of the rotating parts so as to limit a rotation angle of the rotating parts.

2. The apparatus of claim 1, wherein the frictional rotation means comprises:

friction balls formed in a ball shape, and arranged at opposite ends of each of the hook parts; and return springs, each return spring arranged between the friction balls disposed in a gap between the hook parts and providing an elastic restoring force with respect to a rotational displacement of the friction balls rotated along the circumferential direction.

3. The apparatus of claim 1, wherein the first stoppers are disposed radially from the center of the axial direction of the fixed member, the first stoppers being disposed in a space between the inner circumferential surface of the input member and the outer circumferential surface of the friction flange part.

4. The apparatus of claim 1, wherein each of the hook parts is configured such that a central portion protrudes toward the center of an axial direction of the inner circumferential surface of the input member, and opposite ends are spaced apart from each other by a predetermined distance along the inner circumferential surface of the input member from the central portion, thereby enabling press-fitted inclination surfaces to be formed between the central portion and the opposite ends.

5. The apparatus of claim 1, wherein the input member is linked with a handle lever of an outer portion of the seat cushion so that a rotating force is provided from the outer portion, and the output member is linked with a link means disposed in the seat cushion so that the rotating force provided by the input member is transmitted to the link means.

* * * * *